May 1, 1962     L. B. SCOTT ET AL     3,032,702
FUNCTION GENERATOR

Filed July 29, 1959     2 Sheets-Sheet 1

INVENTORS
LARKIN B. SCOTT
FRANKLIN B. HUTCHINSON

BY
*Garold E. Bramblett Jr.*

May 1, 1962  L. B. SCOTT ET AL  3,032,702
FUNCTION GENERATOR

Filed July 29, 1959  2 Sheets-Sheet 2

INVENTORS
LARKIN B. SCOTT
FRANKLIN B. HUTCHINSON

BY

United States Patent Office 3,032,702
Patented May 1, 1962

3,032,702
FUNCTION GENERATOR
Larkin B. Scott, Fort Worth, Tex., and Franklin B. Hutchinson, Fairfield, Conn., assignors to The Perkin-Elmer Corporation, Norwalk, Conn., a corporation of New York
Filed July 29, 1959, Ser. No. 830,295
8 Claims. (Cl. 323—61)

The "closed loop" has become commonplace in today's instrumentation. A servo of one description or another can be found in almost any automatic device that performs a measurement or control action. In the most common variety of servo problems, performance requirements can be met by a servo whose response features, such as band width or velocity error constant, become fixed quantities varied only during the original design process. In such a servo, the loop gain is no more than a function of frequency and is not usually afforded any further variation based on the measurement of other variables encountered during operation.

The vital parts of a servo in this class are familiar mechanisms. While the input and output are mechanical motions, the basic measurements leading to the formation of an error signal are electrical. This is but one of the many examples in which a device is needed, sometimes called a transducer, that will translate a mechanical displacement into a proportionally valued electrical voltage. The resistive voltage divider, or potentiometer, is perhaps the most widely applied solution to this transducer problem, and precision devices of this type exist in a variety of forms.

In the simple fixed-behavior servo, there seldom arises the need to establish a voltage versus input mechanical function that is markedly different from a straight line. However, as new servo problems arise, it is found more and more frequently that for satisfactory operation over an entire range, certain parameters must be continuously adjusted according to various functions of certain variables in the system. These adjustments are rarely accomplished by the introduction of linear or other simple relationships between the controlled parameter and the controlling variable. This fact has resulted in requirements for transducers having non-linear relationships between shaft angle input and voltage output.

A good example of the need for non-linear functions in a servo system is found in the automatic flight control of modern day aircraft. The control loop affecting stability of the aircraft about some axis must have its signal gain or other properties adjusted continuously to compensate for changes in altitude, Mach number, and wing loading. In prior art servo systems, the desired function is commonly obtained by the use of resistive voltage dividers or potentiometers since it is often possible to provide a shaft rotation for each variable affecting the servo characteristic. The potentiometer may simply be used as a variable attenuator for the error signal. If the function to be introduced is only mildly varying, the potentiometer can be made in a relatively simple manner by adjusting turn spacing. It will often be found, however, that the desired function is of a more radical nature and may even involve a reversal of slope. To provide such a function in a potentiometer, it becomes necessary to tap the winding and add external resistors to load the potentiometer in the desired manner.

In the beginning of a new auto-pilot design, the exact effects of the flight variables are not known with precision, and the control system designer must calculate the desired compensating functions based on wind tunnel test data. When the system is finally put through its paces during actual flight, a particular compensating function will often be found to be in need of some correction. This is understandable when one considers the task of accounting for all of the factors that might conceivably enter into the problem of computing the function originally. When such need for refinement is encountered, the designer faces the problem of determining the alteration required and of procuring a replacement transducer possessing the new functional relationship.

To determine the extent of change required, it may become necessary to make a temporary installation which provides for manual gain adjustment of the affected servo loop. Optimum values as a function of flight conditions may then be determined empirically by the test crew. When the corrected function has been settled upon, a potentiometer winding design based on the new data must be obtained from the supplier. Each new function may present a separate and time consuming problem. The delay involved in securing a new unit for trial is greater than can be tolerated by the pace of some development programs so that a great burden is on the system designer to be correct on the first approximation.

It is, therefore, a primary object of the present invention to provide a shaft angle to voltage transducer having an output function which can be externally adjusted. Other objects are to provide such a transducer having a conformity adjustment which will include curves of any arbitrary shape, to provide such a transducer wherein adjustment of one portion of the curve is independent of adjustments elsewhere, and to provide a transducer whose response curve can be fixed to match any experimentally determined curve without design study or computation.

The above objects are attained by providing electrical apparatus comprising a series of terminals, one of which is a reference terminal, and means for maintaining a potential difference of predetermined value between the reference terminal and each of the other terminals. A plurality of secondary potential supply means are provided along with means for selectively connecting each of them in series relationship with any of the terminals. Other means are provided for deriving potentials intermediate the resultant of the potentials of each of the secondary voltage supply means and the potential of its associated terminal. These means include a continuous electrical path in the form of a closed loop of distributed impedance subdivided into sections by taps at at least three substantially equally spaced points thereon. Switching means are provided for connecting pairs of adjacent taps in rotation to successive pairs of secondary potential supply means and a movable contact is provided along the section of the impedance loop between the taps connected to a pair of secondary potential supply means.

This invention will be more apparent from the following description taken together with the attached drawings wherein.

Figure 1:
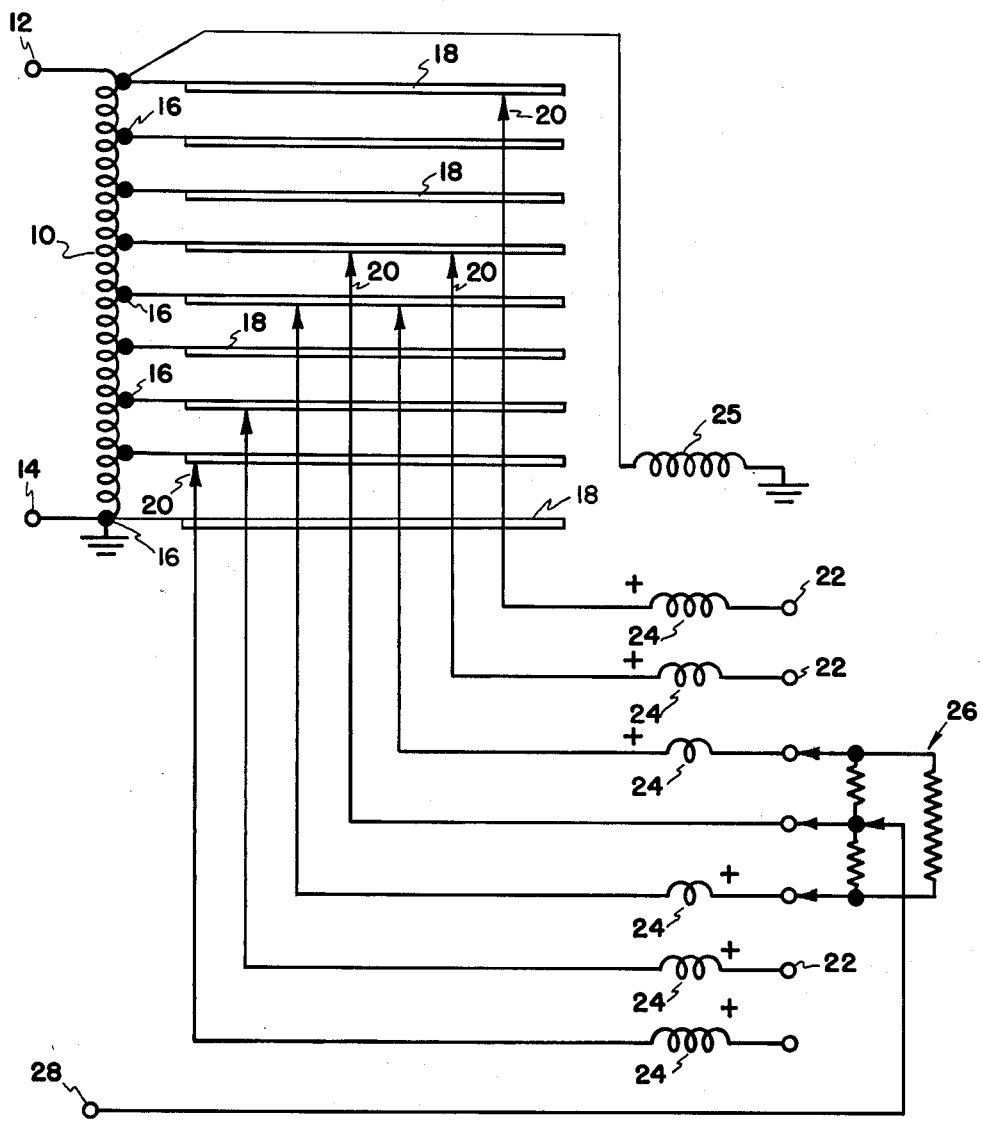
FIG. 1 is a schematic diagram of an apparatus of the type described herein.
Figure 2:
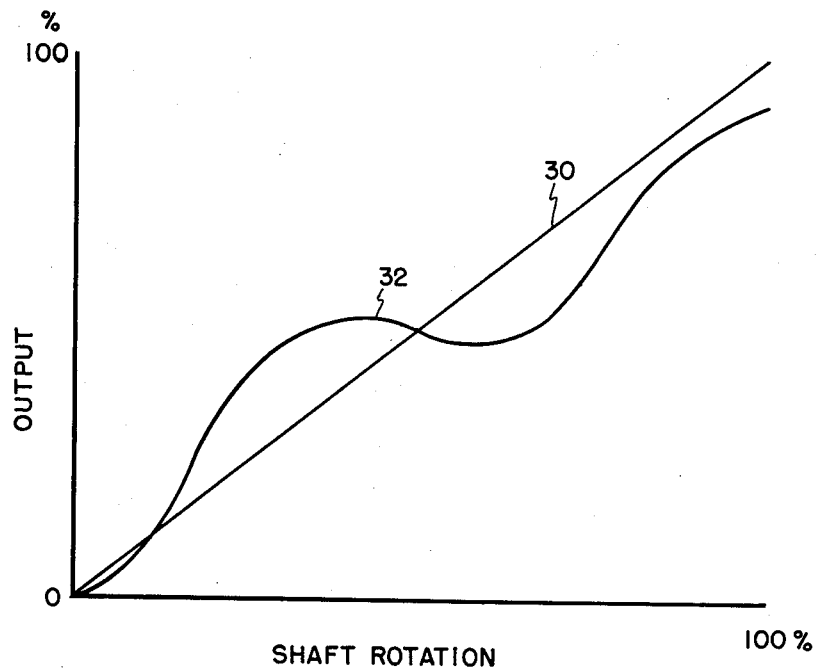
FIG. 2 is a graph of the output voltage v. shaft rotation of an apparatus of the invention.

This invention is a major improvement and modification of the invention described and claimed in United States Patent 2,843,822 entitled Precision Transducer, which issued July 15, 1958. As disclosed therein, the invention comprised a precision transducer having greater resolution, smoothness, and linearity than any available prior art devices. FIGS. 15 and 16 of that patent disclose in schematic form the manner in which various voltages along an auto-transformer or potentiometer are selected by a sliding contact operating within a closed impedance loop which in turn is selectively connected to successive taps along the auto-transformer. By the present invention a novel switch and transformer arrangement is inserted between the auto-transformer taps and the nutating contacts of the closed impedance loop. By utilizing such a transformer-switch arrangement, it becomes possible to provide a device having an adjustable non-linear voltage output of any desired form while maintaining smoothness and reliability of operation. FIG. 1 shows an auto-transformer 10 having input terminals 12 and 14. Taps 16 are provided at spaced intervals along the winding of transformer 10. Each of taps 16 is electrically connected with an individual bus conductor 18. Sliding contacts 20 are provided which may be adjusted to contact any of buses 18. Each of sliding contacts 20 is electrically connected to one of terminals 22. Intermediate between each of terminals 22 and its associated sliding contact 20 may be located a secondary voltage supply source 24 which, in the illustrated embodiment, takes the form of a transformer secondary supplied by a primary winding 25 as illustrated in the figure. An interpolating potentiometer 26 of the type referred to in the above-mentioned patent is provided having an output terminal 28 for smoothly and continuously selecting voltages intermediate adjacent terminals 22. It will be apparent from the foregoing figure that the voltage at any one of terminals 22 will be the algebraic sum of the potential difference across an associated secondary transformer winding 24 and the potential difference between whichever of taps 16 it may be connected to and terminal 14. Voltage supply sources 24 may be selected in such a way that rotation of the potentiometer shaft with all sliding contacts 20 on a common bus will give a wave shape roughly conforming to a desired output. It is thereby possible to generate a voltage output widely variable about such a "nominal" curve. In the illustrated embodiment, the central terminal of terminals 22 is not connected to a secondary potential source. The other terminals are provided with potential sources of increasing value but of opposite polarity as indicated. If each of sliding contacts 20 is set on a common bus 18 connected to the midpoint of transformer 10 through a suitable tap 16, the voltage existing at each of terminals 22, except for the terminal having no secondary potential source, will include the same voltage increments from transformer 10 plus or minus a voltage produced by corresponding voltage source 24. If it is desired to provide a linear uncorrected output as illustrated by curve 30 of FIG. 2, this may be easily accomplished by proper selection of the number of turns of secondary transformer winding 24 inserted with each of terminals 22. It will then be seen that any movement of sliding contacts 20 either toward terminal 12 or terminal 14 will serve to either add or subtract a corresponding voltage increment to the curve 30 of FIG. 2. An adjusted output of a type readily obtainable from an apparatus of the type disclosed herein is indicated by curve 32 of FIG. 2.

In an exemplary apparatus of the type disclosed, 100 taps were provided along the winding of an auto-transformer so as to provide 1% increments of voltage therealong. Thirty-one sliding contacts were then provided to conform with the number of commutator bars (terminals 22) readily available on a precision transducer of the type referred to in the aforementioned patent. A secondary potential supply was employed in order to produce a linear nominal curve when all the sliding contacts were set at the mid-point of the auto-transformer. A total of 2700 turns were wound on a magnetic core and 300 were used as a primary winding. The remaining 2400 turns were divided into discrete secondary windings and were individually connected in either additive or subtractive polarity with the voltage existing at the mid-point of the auto-transformer winding. In the actual apparatus buses 18 and sliding contacts 20 are enclosed in a separate container having external, easily-adjustable slides for moving the sliding contacts. Any desired correction may thus be applied to the designed output curve by manual adjustment taking only a few seconds time.

While this invention has been particularly described with reference to a linear nominal curve, it is not so limited. An output curve of any shape may be employed as a basis for the adjustment apparatus herein described. Furthermore, this invention is not limited to the use of a transformer for supplying the nominal curve. Any sources of electrical potential would be equally suitable.

We claim:

1. Electrical apparatus which comprises a series of terminals, one of which is a reference terminal; means for maintaining a potential difference of predetermined value between the reference terminal and each of the respective other terminals along the series; a plurality of secondary potential supply means; means for selectively connecting each of said secondary potential supply means in series relationship with any of said terminals; and means for deriving potentials intermediate the resultant of the potential difference across each of said secondary potential supply means and the potential difference between its associated terminal and the reference terminal and the resultant of the potential difference across another of said secondary potential supply means and the potential difference between its associated terminal and the reference terminal.

2. Electrical apparatus which comprises a series of terminals, one of which is a reference terminal; means for maintaining a potential difference of predetermined value between the reference terminal and each of the respective other terminals along the series; a plurality of secondary potential supply means; means for selectively connecting each of said secondary potential supply means in series relationship with any of said terminals; electrical impedance means; switching means for connecting said impedance means in series with successive pairs of said secondary potential means; and a contact movable along said impedance means.

3. Electrical apparatus which comprises a series of terminals, one of which is a reference terminal; means for maintaining a potential difference of predetermined value between the reference terminal and each of the respective other terminals along the series; a plurality of secondary potential supply means; means for selectively connecting each of said secondary potential supply means in series relationship with any of said terminals; means for deriving potentials intermediate the resultant of the potential difference across each of said secondary potential supply means and the potential difference between its associated terminal and the reference terminal and the resultant of the potential difference across another of said secondary potential supply means and the potential difference between its associated terminal and the reference terminals, said means including a continuous electrical path in the form of a closed loop of distributed impedance subdivided into sections by taps at at least three substantially equally spaced points thereon; switching means for connecting pairs of adjacent taps in rotation to successive pairs of said secondary potential supply means; and a contact movable along that section of the impedance loop between the taps on said section connected to a pair of secondary potential supply means.

4. Electrical apparatus which comprises a series of terminals, one of which is a reference terminal; means for maintaining a potential difference of predetermined value between the reference terminal and each of the respective other terminals along the series; a plurality of secondary potential supply means; means for selectively connecting each of said secondary potential supply means in series relationship with any of said terminals; means for deriving potentials intermediate the resultant of the potential difference across each of said secondary potential supply means and the potential difference between its associated terminal and the reference terminal and the resultant of the potential difference across another of said secondary potential supply means and the potential difference between its associated terminal and the reference terminal, said means including a continuous electrical path in the form of a closed loop of distributed impedance subdivided into sections by taps at at least three substantially equally spaced points thereon; switching means for connecting pairs of adjacent taps in rotation to successive pairs of secondary potential supply means; and means for moving the contact and operating the switching means, said moving and operating means causing the contact to at all times engage the section connected to a pair of adjacent secondary potential supply means and to connect the next section in rotation across the next pair of adjacent potential supply means along the series before the contact engages said next section.

5. An electrical apparatus which comprises an autotransformer having a winding with input terminals at its ends; a series of intermediate terminals connected to spaced convolutions along the winding; a plurality of secondary potential supply means each disposed to be selectively series connected to any of said intermediate terminals; a secondary terminal connected to the other end of each of said secondary potential supply means; and means for deriving the potential difference between one of said input terminals and a point intermediate any pair of said secondary terminals.

6. An electrical apparatus which comprises an autotransformer having a winding with input terminals at its ends; a series of intermediate terminals connected to spaced convolutions along the winding; a plurality of secondary potential supply means each disposed to be selectively series connected to any of said intermediate terminals; electrical impedance means; switching means for connecting said impedance means across successive pairs of said secondary potential means; and a contact movable along said impedance means to select a potential therefrom.

7. An electrical apparatus which comprises an autotransformer having a winding with input terminals at its ends; a series of intermediate terminals connected to spaced convolutions along the winding; a plurality of secondary potential supply means each disposed to be selectively series connected to any of said intermediate terminals; a continuous electrical path in the form of a closed loop of distributed impedance subdivided into sections by taps at at least three substantially equally spaced points thereon; switching means for connecting pairs of adjacent taps in sequence to successive pairs of said secondary terminals; and a contact movable along that section of the impedance loop between the taps connected to a pair of said secondary terminals.

8. An electrical apparatus which comprises an autotransformer having a winding with input terminals at its ends; a series of intermediate terminals connected to spaced convolutions along the winding; a plurality of secondary potential supply means each disposed to be selectively series connected to any of said intermediate terminals; a continuous electrical path in the form of a closed loop of distributed impedance subdivided into sections by taps at at least three substantially equally spaced points thereon; switching means for connecting pairs of adjacent taps in sequence to successive pairs of said secondary terminals; and means for moving the contact and operating the switching means, said moving and operating means causing the contact to at all times engage the section connected to a pair of secondary terminals and to connect the next section in sequence across the next pair of secondary terminals before the contact engages said next section.

References Cited in the file of this patent
UNITED STATES PATENTS

| | | |
|---|---|---|
| 1,582,060 | Lovejoy | Apr. 27, 1926 |
| 2,201,642 | Bauer | May 21, 1940 |
| 2,572,545 | Walker | Oct. 23, 1951 |
| 2,843,822 | Scott | July 15, 1958 |
| 2,889,504 | Spencer | June 2, 1959 |